(12) United States Patent
Casalins Cuñado

(10) Patent No.: US 11,325,872 B2
(45) Date of Patent: May 10, 2022

(54) CONCENTRATED AQUEOUS SUSPENSION OF MICROFIBRILLATED CELLULOSE COMPRISING SALTS FOR PLANT NUTRITION

(71) Applicant: Total Grow LLC, Sheridan, WY (US)

(72) Inventor: Agustín Carlos Casalins Cuñado, Buenos Aires (AR)

(73) Assignee: Total Grow LLO, Sheridan, WY (US)

( * ) Notice: Subject to any disclaimer, the term of this patent is extended or adjusted under 35 U.S.C. 154(b) by 25 days.

(21) Appl. No.: 16/442,561

(22) Filed: Jun. 17, 2019

(65) Prior Publication Data

US 2020/0392051 A1  Dec. 17, 2020

(51) Int. Cl.
| | |
|---|---|
| *C05G 5/27* | (2020.01) |
| *C05F 5/00* | (2006.01) |
| *C05D 3/00* | (2006.01) |
| *C05C 5/04* | (2006.01) |
| *A01C 21/00* | (2006.01) |
| *C05D 9/02* | (2006.01) |
| *C05C 5/02* | (2006.01) |
| *C05B 7/00* | (2006.01) |
| *A01G 31/00* | (2018.01) |
| *C05C 11/00* | (2006.01) |

(52) U.S. Cl.
CPC ................ *C05G 5/27* (2020.02); *A01C 21/00* (2013.01); *A01G 31/00* (2013.01); *C05B 7/00* (2013.01); *C05C 5/02* (2013.01); *C05C 5/04* (2013.01); *C05C 11/00* (2013.01); *C05D 3/00* (2013.01); *C05D 9/02* (2013.01); *C05F 5/002* (2013.01)

(58) Field of Classification Search
CPC .......... A01G 31/00; A01C 21/00; C05G 5/27; C05G 5/02; C05G 5/04; C05F 5/002; C05D 3/00; C05D 9/02; C05C 5/04; C05C 5/02; C05C 11/00; C05B 7/00; Y02P 20/145; Y02A 40/20
See application file for complete search history.

(56) References Cited

U.S. PATENT DOCUMENTS

| | | | |
|---|---|---|---|
| 1,140,618 A | 5/1915 | Sault | |
| 8,864,867 B2 * | 10/2014 | Wells | ...................... C05B 17/02 |
| 2010/0196471 A1 * | 7/2010 | Vriesema | .................. C05C 9/00 71/28 |

FOREIGN PATENT DOCUMENTS

| | | | |
|---|---|---|---|
| CN | 104926430 | 9/2015 | |
| CN | 106007850 | 10/2016 | |
| CN | 108033842 | 5/2018 | |
| CN | 108658642 | 10/2018 | |
| DE | 0051230 B1 * | 7/1984 | ................ C08J 3/06 |
| GB | 741493 | 12/1955 | |
| GB | 803052 | 10/1958 | |
| GB | 1108164 | 4/1968 | |
| GB | 1138318 | 1/1969 | |
| GB | WO2014091212 A1 * | 6/2014 | ............ D21H 11/18 |
| WO | WO 2011/151523 | 12/2011 | |
| WO | WO 2014/203112 | 12/2014 | |
| WO | WO 2018/158677 | 9/2018 | |

OTHER PUBLICATIONS

Mosaic ("Calcium Carbonate (Limestone)", accessed from cropnutrition. com) (Year: 2021).*
Hjørnevik ("Why Cellulose Fibrils is a Completely New Cellulose Product", 2018, accessed from exilva.com) (Year: 2018).*
English Translation of EP0051230 B1 (Year: 2014).*
PubChem ("Calcium Sulfate", 2021, accessed from pubchem.ncbi. nlm.nih.gov) (Year: 2021).*
Carrasco et al. "La Empresa Hidroponica de Mediana Escala: La Tecnica de la Solucion Nutritiva Recirculante ('NFT')", Organizacion de las Naciones Unidas Para la Agricultura y la Alimentacion, Universidad de Talca. Chile, Officina Regional de la FAO Para America Latina y El Caribe, Manual Tecnico, p. 1-62, 1996.
Gilsanz "Hidroponia", Institute Nacional de Investigacion Agropecuaria, Ministerio de Ganaderia Agricultura y Pesca, Republica Oriental del Uruguay, p. 1-31, 2007.
Pinkney et al. "Microfibrillated Cellulose—A New Structural Material", School of Chemical Engineering, University of Birmingham, GB, 2 P., 2019.

* cited by examiner

*Primary Examiner* — Jennifer A Smith
(74) *Attorney, Agent, or Firm* — Stradley Ronon Stevens & Young LLC

(57) ABSTRACT

A concentrated aqueous suspension of microfibrillated cellulose (MFC) comprising salts for plant nutrition, the concentrated aqueous suspension comprises microfibrillated linear polymers of D-glucose molecules homogenized through a fibrillation process (cellulose microfibers), calcium ions, sulfate ions and other substances for plant nutrition, being the concentration of calcium ions and sulfate ions in excess of the concentration corresponding to the solubility of calcium sulfate in water and being the proportion of microfibrillated cellulose (MFC) within a range of 1% and 99% w/w of the suspension.

17 Claims, No Drawings

CONCENTRATED AQUEOUS SUSPENSION OF MICROFIBRILLATED CELLULOSE COMPRISING SALTS FOR PLANT NUTRITION

FIELD AND BACKGROUND OF THE INVENTION

This invention relates to nutrient solutions for plants. More specifically, it pertains to an aqueous suspension of microfibrillated cellulose that involves nutrients which are useful for plant growth using hydroponic technique or fertirrigation.

In hydroponics and fertirrigation, concentrated nutrient solutions called "stock" are used as fertilizers. Stock solutions are formulated by mixing inorganic salts in high concentrations and their purpose is to provide plants with all the mineral elements that they require throughout their lifecycle.

In intensive crops that require hydroponic nutrition or fertirrigation, plants are supplied with all the elements by nutrient solutions prepared by dissolving fertilizing salts in water.

Out of all the known natural elements, only 60 elements have been found in various plants and only 16 elements are generally considered essential for plant growth. Although most plants require only 16 essential elements, some species may need others.

Macroelements include carbon (C), hydrogen (H), oxygen (O), nitrogen (N), phosphorus (P), potassium (K), calcium (Ca), sulfur (S) and magnesium (Mg).

Microelements include iron (Fe), chlorine (Cl), manganese (Mn), boron (B), zinc (Zn), copper (Cu), molybdenum (Mo).

Plants need calcium for growth. Calcium is supplied by calcium nitrate, which also provides nitrogen. Any other necessary additional nitrogen is provided by potassium nitrate which also provides potassium.

Plants also require a form of sulfur to be utilized in the formation of amino acids which are involved in their process of growth. Sulfur is usually provided by inorganic sulfate, which can be easily utilized by plants.

Phosphorus is obtained from monopotassium phosphate which also provides potassium. The remaining needs for potassium can be obtained from potassium sulfate that also provides some sulfur. The sulfur that may still be needed can be obtained from other sulfates such as magnesium sulfate, which is also used to cover magnesium needs.

The formulations for fertilizers vary according to the specific requirements of each crop, its stage of development and the surrounding climatic conditions.

In order to provide the crops with all the needed elements, two different "stock" solutions, generally called "A" and "B", must be prepared. The solutions need to be prepared separately in order to avoid precipitation of calcium sulfate from calcium provided in stock A and sulfur—in the form of inorganic sulfate—provided in stock B. If they were to precipitate, the elements would stop being available for plants. It is important to clarify that both calcium and sulfur are essential elements for plants and must be necessarily added to nutrient solutions. Calcium is utilized for growth while sulfur is utilized to form amino acids. The latter is usually provided as inorganic sulfate since, in this form, it can be easily absorbed by the plants.

Since calcium sulfate is poorly soluble in water (at a rate of 0.67 grams/liter at 77° F. and neutral pH), nutrient solutions are formulated as stock A and B so as to add calcium and sulfate separately (the latter being generally added as magnesium sulfate and/or potassium sulfate). It would not be commercially viable to formulate a diluted solution combining calcium and sulfate at such low levels of concentration in order to avoid the precipitation of calcium sulfate.

Chelates are widely used in hydroponics, fertirrigation and fertilization, since they are essential to provide the nutrient solutions with microelements. Chelates are organic structures that are capable of "wrapping" the ions of the microelements, thus making them stable in the solutions and preventing them from bonding with other cations and precipitating. Besides, together with the microelements, they form a ligation that improves the plant's absorption capacity of the latter.

Chelates are particularly important for the provision of iron, since it is the microelement that can more easily form hydroxides and insoluble salts with other ions that are present in the nutrient solutions. It is worth mentioning that iron is essential for chlorophyll synthesis because it acts as a carrier of electrons during photosynthesis and cellular respiration, activating some enzymes as well. There cannot be a nutrient solution formulation without the incorporation of iron. As result of this, it is added in its chelated form. A preferred chelating agent is EDTA.

There have been attempts to solve the problem of calcium precipitation with sulfates by chelating calcium, although the latter is not a microelement and it can be perfectly assimilable if it is incorporated through a salt such as calcium nitrate.

However, calcium chelate only remains stable in a pH that ranges from 6 to 14, while on the other hand iron chelate remains stable only under acidic conditions. Therefore, the pH range that would enable the incorporation of all the nutrients by using both chelates is very limited (6 to 7). This complicates the obtainment process of the solution and threatens the concentrations of salts that implies higher levels of acidity.

It would be desirable to have a single concentrated solution of the necessary ingredients for plant growth where the precipitation of calcium and sulfur as calcium sulfate could be prevented, as well as the precipitation of other salts such as iron sulfate.

Surprisingly, the inventors of this patent application have found that microfibrillated cellulose (MFC) prevents the precipitation of salts in a pH range from 1 to 13.

SUMMARY OF THE INVENTION

The main object of the invention is a nutrient solution that combines stock A (which provides calcium) and stock B (which provides sulfates) in a single stabilized solution, in a microfibrillated cellulose medium, having a concentration of calcium and sulfate in excess of that corresponding to the normal solubility of calcium sulfate in water.

More specifically, the object of the invention is a concentrated aqueous suspension of microfibrillated cellulose comprising salts for plant nutrition wherein the concentrated aqueous suspension comprises microfibrillated linear polymers of D-glucose molecules homogenized through a fibrillation process (cellulose microfibers), calcium ions, sulfate ions and other substances for plant nutrition, being the concentration of calcium ions and sulfate ions in excess of the concentration corresponding to the solubility of calcium sulfate in water and being the proportion of microfibrillated cellulose (MFC) within a range of 1% and 99% w/w of the suspension.

Another object of the invention is the use of microfibrillated cellulose for the preparation of a concentrated suspension comprising the mixing of microfibrillated linear polymers of D-glucose molecules homogenized through a fibrillation process (cellulose microfibers), calcium ions, sulfate ions and other substances for plant nutrition, being the concentration of calcium ions and sulfate ions in excess of the concentration corresponding to the solubility of calcium sulfate in water and being the proportion of microfibrillated cellulose (MFC) within a range of 1% and 99% w/w of the suspension.

Another object of the invention is a process for the preparation of a concentrated aqueous suspension of microfibrillated cellulose comprising salts for plant nutrition wherein the method comprises the step of mixing microfibrillated linear polymers of D-glucose molecules homogenized through a fibrillation process (cellulose microfibers), calcium ions, sulfate ions and other substances for plant nutrition, being the concentration of calcium ions and sulfate ions in excess of the concentration corresponding to the solubility of calcium sulfate in water and being the proportion of microfibrillated cellulose (MFC) within a range of 1% and 99% w/w of the suspension.

Another object of the invention is a process for plant nutrition using hydroponic or fertirrigation techniques comprising the step of supplying a concentrated aqueous suspension of microfibrillated cellulose comprising salts for plant nutrition wherein the concentrated aqueous suspension comprises microfibrillated linear polymers of D-glucose molecules homogenized through a fibrillation process (cellulose microfibers), calcium ions, sulfate ions and other substances for plant nutrition, being the concentration of calcium ions and sulfate ions in excess of the concentration corresponding to the solubility of calcium sulfate in water and being the proportion of microfibrillated cellulose (MFC) within a range of 1% and 99% w/w of the suspension.

DESCRIPTION OF SPECIFIC EMBODIMENT OF THE INVENTION

The formulations for fertilizers vary according to the specific requirements of each crop, its stage of development and the surrounding climatic conditions.

The salts that are most commonly used for the formulation of stock A are as follows:
  Calcium nitrate
  Potassium nitrate (optional, since it is also present in stock B)
  Ammonium nitrate
  Iron ethylenediamine tetraacetic acid (Fe EDTA)
  Sodium molybdate (dihydrate)
  Ethylenediamine tetraacetic manganese (Mn EDTA)
  Ethylenediamine tetraacetic zinc (Zn EDTA)
  Ethylenediamine tetraacetic magnesium (Mg EDTA)
  Ethylenediamine tetraacetic copper (Cu EDTA)
  Ethylenediamine tetraacetic cobalt (Co EDTA)
  Boric acid
  The most common salts to formulate stock B are:
  Potassium sulfate
  Magnesium sulfate
  Monopotassium phosphate
  Potassium nitrate As described above, stock A usually includes the nitrates (calcium, potassium and ammonium) and the EDTA-chelated microelements. However, another possible common formulation is to incorporate only the nitrates (calcium, potassium and ammonium) and the iron EDTA in stock A; and to incorporate the microelements in the form of sulfates (magnesium, manganese, copper, zinc, etc.) in stock B, so that sulfates and calcium do not precipitate as calcium sulfate.

Surprisingly, applicants of the present patent application found another alternative which involves the use of microfibrillated cellulose (MFC), obtained from a fibrillation process of cellulose in wet state.

Microfibrillated cellulose (MFC) is a substance composed of cellulose and water, with a cellulose concentration of less than 15%. It is characterized by being able to store large quantities of water in relation to its mass, obtaining "creamy" or "gel-type" suspensions with very low proportions of microfibrillated cellulose (as low as 2%). Its pH varies in a range from 4 to 8 and its density between 1.2 and 1.6 kg/L.

Cellulose microfibrils are very small cellulose fibers obtained from the mechanical disintegration of plant fibers and by a sequence of specific chemical and mechanical treatments (fibrillation process).

When the cellulose goes through a fibrillation process, the surface area becomes much larger in comparison with the original raw material, thus generating a significant increase in the quantity of hydroxyl groups (OH) available on the surface of the microfibrils. As this hydroxyl groups have a natural negative charge, they will be able to capture ions with positive charge, such as calcium ions. In this way, the calcium ions are prevented from bonding with the sulfates, avoiding altogether its precipitation as calcium sulfate.

A preferred aqueous suspension of the present invention involves:

All percentages in the following description and in the examples correspond to % w/w
  Between 60% and 90% of water
  Between 1% and 40% of microfibrillated cellulose (MFC)
  Between 1% and 55% of calcium nitrate
  Between 0.01% and 0.5% of magnesium EDTA
  Between 0.01% and 0.7% of manganese EDTA
  Between 0.01% and 0.7% of zinc EDTA
  Between 0.01% and 0.9% iron EDTA
  Between 0.01% and 0.1% of copper EDTA
  Between 0.001% and 0.01% sodium molybdate (Dihydrate)
  Between 0.0001% and 0.001% of cobalt EDTA
  Between 0.01% and 0.4% of boric acid
  Between 1% and 12% of potassium nitrate
  Between 0.5% and 25% of monopotassium phosphate
  Between 0.5% and 42% of magnesium sulfate
  Between 0.1% and 11% of potassium sulfate A most preferred aqueous suspension of the present invention involves:
  18.6 liters of water (68.2%)
  6,000 grams of microfibrillated cellulose (22.0%)
  1,000 grams of calcium nitrate (3.7%)
  12 grams of magnesium EDTA (0.0440%)
  20 grams of manganese EDTA (0.0733%)
  20 grams of zinc EDTA (0.0733%)
  25 grams of iron EDTA (0.0916%)
  3 grams of copper EDTA (0.0110%)
  0.3 grams of Sodium molybdate (Dihydrate) (0.0011%)
  0.03 grams of cobalt EDTA (0.0001%)
  10 grams of boric acid (0.0366%)
  300 grams of potassium nitrate (1.10%)
  400 grams of monopotassium phosphate (1.47%)
  750 grams of magnesium sulfate (2.75%)
  150 grams of potassium sulfate (0.55%)

The following examples show the preparation of concentrated solutions that may contain the necessary components for a plant. The formulations are not intended to specify the required quantities or to restrict the ingredients used. Their main intention is to show the preparation of a concentrated aqueous suspension of this invention.

EXAMPLES

Example 1

Preparation of Concentrated Aqueous Suspension

Example to Prepare 10 Liters of Stock A

The following elements were mixed into 9.3 liters of water at 77° F. and neutral pH (the reason that 9.3 liters of water are added is to get 10 liters of stock A, as salts provide approximately 700 cc of the volume):
1,000 grams of calcium nitrate
12 grams of magnesium EDTA
20 grams of manganese EDTA
20 grams of zinc EDTA
25 grams of iron EDTA
3 grams of copper EDTA
0.3 grams of sodium molybdate (Dihydrate)
0.03 grams of cobalt EDTA
10 grams of boric acid
The weight of the resulting 10 liters of stock A is 10,390 grams.

Example to Prepare 10 Liters of Stock B

The following elements were mixed into 9.3 liters of water at 77° F. and neutral pH (the reason that 9.3 liters of water are added is to get 10 liters of stock B since salts provide approximately 700 cc of the volume):
300 grams of potassium nitrate
400 grams of monopotassium phosphate
750 grams of magnesium sulfate
150 grams of potassium sulfate
The weight of the resulting 10 liters of stock B is 10,900 grams.

Example to Obtain 27.3 Kilos of Concentrated Aqueous Suspension of Stock A and B in Microfibrillated Cellulose The reason that 27.3 kilos are prepared is because the proportions, in this formulation, are 6 parts of microfibrillated cellulose (MFC) for every 10 parts of Stock A (10,390 grams) and 10 parts of Stock B (10,900 grams), which results in the aforementioned quantity.

Six kilos of microfibrillated cellulose (MFC) were mixed into 10 liters of stock A and stirred manually for 5 minutes. Then, 10 liters of stock B were added to the resulting solution and stirred manually for 5 minutes. The resulting solution has the initial composition of stock A and stock B as well as the microfibrillated cellulose (MFC), with a pH of 3.4. This means:
18.6 liters of water (68.2%)
6,000 grams of microfibrillated cellulose (22.0%)
1,000 grams of calcium nitrate (3.7%)
12 grams of magnesium EDTA (0.0440%)
20 grams of manganese EDTA (0.0733%)
20 grams of zinc EDTA (0.0733%)
25 grams of iron EDTA (0.0916%)
3 grams of copper EDTA (0.0110%)
0.3 grams of Sodium molybdate (Dihydrate) (0.0011%)
0.03 grams of cobalt EDTA (0.0001%)
10 grams of boric acid (0.0366%)
300 grams of potassium nitrate (1.10%)
400 grams of monopotassium phosphate (1.47%)
750 grams of magnesium sulfate (2.75%)
150 grams of potassium sulfate (0.55%)
The weight of the suspension is 27,290 grams.

Examples of Mixes with and without Precipitates

Example 2

Stock A and Stock B were Mixed

One hundred (100) cc of the obtained stock A and 100 cc of the obtained stock B were mixed at 77° F.; the mixture was stirred and after 3 minutes the emergence of a precipitate was observed.

Thirty minutes later the mixture was stirred again and 2 minutes after that the precipitate was still present, thus confirming that the precipitate does not re-dissolve.

Example 3

Stock A and MFC were Mixed, then Stock B was Added

One hundred (100) cc of the obtained stock A were mixed into 60 grams of microfibrillated cellulose (MFC); the mixture was stirred manually, and then 100 cc of the obtained stock B were immediately added. After 3 minutes, no precipitate emergence was observed. The sample was monitored 24 hours later, 48 hours later and even 90 days later but no modifications were found in its appearance.

Example 4

Stock B and MFC were Mixed, and then Stock A was Added.

In this example, the order of the stocks in the preparation of the aqueous suspension was exchanged. One hundred (100) cc of the obtained stock B were mixed into 60 grams of microfibrillated cellulose (MFC); the mixture was manually stirred and then 100 cc of the obtained stock A were added. After 3 minutes no precipitate was seen emerging. The sample was monitored 24 hours later, 48 hours later and even 90 days later but no modifications were found in its appearance.

Example 5

This example aims to demonstrate that there is no evidence of toxicity in the use of microfibrillated cellulose (MFC) when it is used in a nutrient solution. We prepared 3 identical small hydroponic floating systems where 2 lettuce specimens were grown.

The hydroponic floating system consisted of 20-liter trays where 2 seedlings of lettuce were laid in each one. The trays had a flat bar of polystyrene to support the seedlings and each of them had two holes that enabled the roots to reach the water contained in the trays.

Hydroponic system number 1 was fed with stock A and stock B nutrient solutions, and no microfibrillated cellulose (MFC) was added. Hydroponic system number 2 was fed with a concentrated aqueous suspension of stock A and B in microfibrillated cellulose (MFC) having a microfibrillated cellulose (MFC) concentration of 23%. Hydroponic system number 3 was fed with a concentrated aqueous suspension of stock A and B in microfibrillated cellulose (MFC), having a microfibrillated cellulose (MFC) concentration of 80%.

The amount of solution and/or aqueous suspension added in the three systems had the same electrical conductivity in each case, ensuring the same provision of salts in each of them (electrical conductivity is a measure of the amount of dissolved solids per unit of volume)

The targeted electrical conductivity varied from week to week, depending on the requirements of the lettuce plants in their lifecycle, having 350 ppm in week 1, 700 ppm in week 2, 1,050 ppm in week 3 and 1,400 ppm in week 4.

After week 4 all the lettuce plants had showed equal growth and reached a weight ranging between 270 and 280 grams each.

Thus, we can conclude that microfibrillated cellulose (MFC) allows for the availability of salts for plants as well as the right absorption of nutrients since the growth of specimens studied did not reveal significant variations.

Example 6

Next example shows how microfibrillated cellulose (MFC) prevents calcium sulfate from precipitating even when solutions of calcium nitrate and sulfates in their highest possible concentration at 77° F. and neutral pH are mixed.

Two samples were tested:

A control sample where 3 salt dilutions at its highest possible concentration at 77° F. and neutral pH were mixed, in this order: 180 cc of water *, 100 cc of calcium nitrate solution (1,200 grams in 1 liter of water), 100 cc of potassium sulfate solution (120 grams in 1 liter of water) and 100 cc of manganese sulfate solution (710 grams in 1 liter of water).

*One hundred and eighty (180) cc of water was added so as to equate the volumes in the samples (water in the first one and microfibrillated cellulose in the second one).

After mixing them mechanically, we observed a precipitate of 192 grams of calcium sulfate.

In the other sample, 3 salt dilutions at its highest possible concentration at 77° F. and neutral pH, were mixed in microfibrillated cellulose (MFC), following this order: 100 cc of calcium nitrate solution (1,200 grams in 1 liter of water) in 60 grams of MFC, 100 cc of potassium sulfate solution (120 grams in 1 liter) in 60 grams of MFC, and finally 100 cc of manganese sulfate solution (710 grams in a liter) in 60 grams of MFC. The 3 suspensions were mixed altogether.

There were no signs of a precipitate after 48 hours.

Example 7

This example shows that MFC makes it possible to elaborate suspensions of homogeneously distributed salts that contain solids in a much higher proportion than the quantity of salts that could be contained in a water solution of the same volume.

We ran two sample tests.

A control sample where potassium sulfate was added in an amount that exceeded twice its solubility in water at 77° F. and neutral pH (111 g/L). More specifically, we mixed 28.8 grams of potassium sulfate in 130 cc of water at 77° F. It was stirred manually and immediately after that a precipitate of potassium sulfate was noted.

Sample number 2 consisted of the same amount of potassium sulfate contained in the control sample (that is, 28.8 grams) that was added into a suspension of the same volume (130 cc) with microfibrillated cellulose (MFC) at 23% (30 grams of microfibrillated cellulose in 100 cc of water). It was stirred manually and after 5 minutes no decantation of potassium sulfate was observed. The sample was monitored 24 hours later, 48 hours later and even 90 days after without having observable modifications in its appearance.

The suspension object of the present invention has the following advantages over the prior art:

Aqueous suspension permits to have in only one solution the combination of salts whose concentration would naturally lead to precipitate.

It permits to elaborate complete formulations that are totally balanced for each type of crop in only one suspension.

Simplification over the use of fertilizers, since there is no longer need to handle several solutions such as stock A and stock B.

Lower transportation costs and carbon footprint reduction due to the possibility to transport a greater amount of salts in the same volume.

Reduction in packaging as a result of the fewer wrappings needed to deliver the complete formulations.

Product shelf-life: the product shelf-life increases due to the stability of the suspension Lower storage costs and convenient stock management.

What is claimed is:

1. A concentrated aqueous suspension for plant nutrition comprising (w/w):
    between 0.5% and 99% of water;
    between 1% and 40% of microfibrillated cellulose (MFC);
    between 0.1% and 55% of calcium nitrate;
    between 0.01% and 0.5% of magnesium EDTA;
    between 0.01% and 0.7% of manganese EDTA;
    between 0.01% and 0.7% of zinc EDTA;
    between 0.01% and 0.9% iron EDTA;
    between 0.01% and 0.1% of copper EDTA;
    between 0.001% and 0.01% sodium molybdate (Dihydrate);
    between 0.0001% and 0.001% of cobalt EDTA;
    between 0.01% and 0.4% of boric acid;
    between 1% and 12% of potassium nitrate;
    between 0.5% and 25% of monopotassium phosphate;
    between 0.5% and 42% of magnesium sulfate; and
    between 0.1% and 11% of potassium sulfate,
wherein the calcium ions and sulfate ions have a concentration in excess of the concentration corresponding to the solubility of calcium sulfate in water, and
wherein the percipitation of salts is prevented in a pH range of 1 to 13.

2. The concentrated aqueous suspension for plant nutrition according to claim 1, further comprises:
    18.6 liters of water (68.2% w/w);
    6,000 grams of microfibrillated cellulose (22.0% w/w);
    1,000 grams of calcium nitrate (3.7% w/w);
    12 grams of magnesium EDTA (0.0440% w/w);
    20 grams of manganese EDTA (0.0733% w/w);
    20 grams of zinc EDTA (0.0733% w/w);
    25 grams of iron EDTA (0.0916% w/w);
    3 grams of copper EDTA (0.0110% w/w);
    0.3 grams of Sodium molybdate (Dihydrate) (0.0011% w/w);
    0.03 grams of cobalt EDTA (0.0001% w/w);
    10 grams of boric acid (0.0366% w/w);
    300 grams of potassium nitrate (1.10% w/w);
    400 grams of monopotassium phosphate (1.47% w/w);
    750 grams of magnesium sulfate (2.75% w/w);
    150 grams of potassium sulfate (0.55% w/w).

3. The concentrated aqueous suspension for plant nutrition according to claim 1, further comprising (w/w):
   between 1% and 5% of potassium nitrate,
   between 5% and 10% of monopotassium phosphate,
   between 8% and 15% of magnesium sulfate, and
   between 15% and 20% of calcium nitrate.

4. The concentrated aqueous suspension for plant nutrition according to claim 1, further comprising (w/w):
   between 5% and 10% of potassium nitrate,
   between 1% and 7% of monopotassium phosphate,
   between 5% and 10% of magnesium sulfate,
   between 5% and 15% of calcium nitrate, and
   between 0.1% and 3% of potassium sulfate.

5. The concentrated aqueous suspension for plant nutrition according to claim 1, furthr comprising (w/w):
   between 5% and 10% of potassium nitrate, p1 between 1% and 7% of monopotassium phosphate,
   between 5% and 15% of magnesium sulfate, and
   between 1% and 5% of calcium nitrate.

6. The concentrated aqueoous suspension for plant nutrition according to claim 1, further comprising (w/w):
   between 5% and 10% of monopotassium phosphate, p1 between 15% and 25% of magnesium sulfate, and
   between 5% and 15% of calcium nitrate.

7. The concentrated aqueoous suspension for plant nutrition according to claim 1, further comprising (w/w):
   between 10% and 12% of potassium nitrate,
   between 5% and 10% of monopotassium phosphate, p1 between 15% and 25% of magnesium sulfate,
   between 25% and 35% of calcium sulfate, and
   between 1% and 3% of potassium sulfate.

8. The concentrated aqueous suspension for plant nutrition according to claim 1, further comprising (w/w):
   between 5% and 10% of potassium nitrate,
   between 5% and 10% of monopotassium phosphate, p1 between 5% and 15% of magnesium sulfate, and
   between 20% and 30% of calcium nitrate.

9. The concentrated aqueoous suspension for plant nutrition according to claim 1, further comprising (w/w):
   between 5% and 10% of potassium nitrate,
   between 1% and 7% of monopotassium phosphate, p1 between 5% and 15% of magnesium sulfate, and
   between 25% and 35% of calcium nitrate.

10. The concentrated aqueous suspension for plant nutrition according to claim 1, further comprising (w/w):
    between 1% and 5% of potassium nitrate,
    between 1% and 7% of monopotassium phosphate, p1 between 1% and 7% of magnesium sulfate, and
    between 5% and 15% of calcium nitrate.

11. The concentrated aqueoous suspension for plant nutrition according to claim 1, further comprising (w/w):
    between 10% and 12% of potassium nitrate,
    between 1% and 7% of monopotassium phosphate, p1 between 1% and 7% of magnesium sulfate, and
    between 25% and 35% of calcium nitrate.

12. The concentrated aqueoous suspension for plant nutrition according to claim 1, further comprising (w/w):
    between 10% and 12% of potassium nitrate,
    between 1% and 7% of monopotassium phosphate, p1 between 1% and 7% of magnesium sulfate, and
    between 5% and 15% of calcium nitrate.

13. The concentrated aqueous suspension for plant nutrition according to claim 1, further comprising (w/w):
    between 1% and 5% of potassium nitrate,
    between 1% and 7% of monopotassium phosphate, p1 between 5% and 15% of magnesium sulfate, and
    between 30% and 40% of calcium nitrate.

14. The concentrated aqueoous suspension for plant nutrition according to claim 1, further comprising (w/w):
    between 5% and 15% of calcium nitrate;
    between 35% and 42% of magnesium sulfate; p1 between 10% and 12% of potassium nitrate; and
    between 1% and 7% of monopotassium phosphate.

15. The concentrated aqueoous suspension for plant nutrition according to claim 1, further comprising (w/w):
    between 5% and 15% of magnesium sulfate;
    between 10% and 20% of monopotassium phosphate, p1 between 5% and 15% of calcium nitrate, and
    between 5% and 10% of potassium nitrate.

16. The concentrated aqueous suspension for plant nutrition according to claim 1, wherein the suspension comprises between 60% and 90% of water.

17. The concentrated aqueous suspension for plant nutrition according to claim 1, wherein the suspension comprises between 0.5% and 90% of water and between 1% and 22% of MFC.

* * * * *